(12) United States Patent
Kishima et al.

(10) Patent No.: US 7,420,908 B2
(45) Date of Patent: Sep. 2, 2008

(54) OPTICAL RECORDING MEDIUM

(75) Inventors: Koichiro Kishima, Kanagawa (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 373 days.

(21) Appl. No.: 10/480,368

(22) PCT Filed: Apr. 4, 2003

(86) PCT No.: PCT/JP03/04354

§ 371 (c)(1),
(2), (4) Date: Jul. 23, 2004

(87) PCT Pub. No.: WO03/088233

PCT Pub. Date: Oct. 23, 2003

(65) Prior Publication Data

US 2004/0246868 A1 Dec. 9, 2004

(30) Foreign Application Priority Data

Apr. 16, 2002 (JP) ............................ 2002-112884

(51) Int. Cl.
*G11B 7/24* (2006.01)
(52) U.S. Cl. ................ 369/275.2; 369/275.5; 369/288; 369/94
(58) Field of Classification Search ............. 369/275.5, 369/275.2, 288, 94, 283, 100; 428/64.1–64.6
See application file for complete search history.

(56) References Cited

U.S. PATENT DOCUMENTS 5,545,454 A * 8/1996 Yamada et al. ............. 428/64.1
6,764,736 B2 * 7/2004 Kitaura et al. ............. 428/64.1
6,858,278 B2 * 2/2005 Kojima et al. ............. 428/64.1

FOREIGN PATENT DOCUMENTS

| EP | 11154352 | | 6/1999 |
|---|---|---|---|
| EP | 1 052 631 | A2 | 11/2000 |
| EP | 2002260275 | | 9/2002 |
| JP | 11-500253 | A | 1/1999 |
| JP | 2001-28148 | A | 1/2001 |
| JP | 2002-260275 | A | 9/2002 |
| JP | 2003-173573 | A | 6/2003 |
| WO | WO 97/14145 | | 4/1997 |
| WO | WO 02/059890 | A1 | 8/2002 |

* cited by examiner

*Primary Examiner*—Ali Neyzari
(74) *Attorney, Agent, or Firm*—Robert J. Depke; Rockey, Depke & Lyons, LLC (57) ABSTRACT

An optical recording medium including two or more recording layers which are capable of transmitting at a high transmittance recording light or reproducing light for performing recording/reproducing of a first recording layer (3) without having to make the thickness of a second recording film (5) positioned towards the side from which the recording light or the reproducing light enters. An optical recording medium including two or more recording layers, and which includes the first recording layer (3), the second recording layer (5) positioned further towards, with an intermediate layer (4) in between, the side from which the recording light or the reproducing light enters than is the first recording layer (3), and includes, between the above-mentioned intermediate layer (4) and the above-mentioned second recording layer (5), a dielectric layer (7) for increasing the transmittance for light passing through the above-mentioned second recording layer as the incident angle of the light becomes greater.

12 Claims, 7 Drawing Sheets

OPTICAL RECORDING MEDIUM

This application claims priority to Japanese Patent Application Number JP2002-112884, filed Apr. 16, 2002 which is incorporated herein by reference.

TECHNICAL FIELD

The present invention relates to an optical recording medium having two or more recording layers.

BACKGROUND ART

Figure 10:
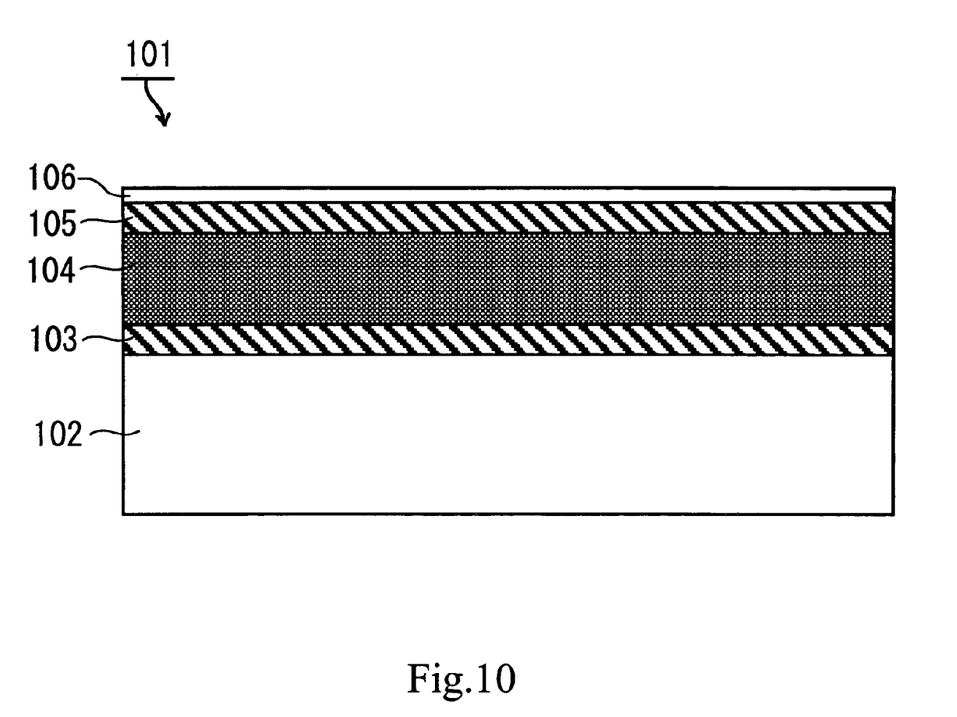
FIG. 10 is a sectional view of a main portion of a conventional optical recording medium.

Optical recording media of a structure in which there are a plurality of recording layers and the recording and/or reproducing of information is/are performed for each of these plurality of recording layers are conventionally known. As shown in FIG. 10, in an optical recording medium 101 of such a structure, a first recording layer 103, an intermediate layer 104, a second recording layer 105 and a cover layer 106 are layered in this order on one principal surface of a substrate 102. In this optical recording medium 101, recording and/or reproducing is performed using laser light that is incident from the side opposite to the substrate 102, that is, from the side of the cover layer 106.

If the optical recording medium 101 shown in FIG. 10 is an optical recording medium of a phase change type, the first recording layer 103 and the second recording layer 105 include a phase change recording film which is reversibly changed between a crystalline state and an amorphous state by recording light, and in which these two states can be detected by the difference in reflectance for reproducing light.

In addition, in the first recording layer 103 and the second recording layer 105, a metal material film containing an Al alloy material or an Ag alloy material is formed adjacent to the phase change recording film. This metal material film has the function of enhancing, at the time of reproducing, signals recorded on the phase change recording film, and a heat sink function for rapidly cooling the phase change recording film at the time of recording.

Incidentally, in this optical recording medium 101, sufficient absorption or reflection when recording on and reproducing from the second recording layer 105 is demanded of the second recording layer 105 positioned on the side from which laser light enters, while at the same time it is necessary to transmit laser light of sufficient intensity for recording on and reproducing from the first recording layer 103 when recording on and reproducing from the first recording layer 103.

Since there exists in the phase change recording film and the Al alloys or Ag alloys described above absorption with respect to laser light, enhancing the transmittance of the second recording layer 105, in particular, is an important issue.

As a method of enhancing the transmittance of the second recording layer 105, reducing the thickness of the metal material film constituting the second recording layer 105 may be considered. However, when the thickness of the metal material film is made thinner than the present thickness, the reflectance of the second recording layer 105 may become lower, or its heat capacity as a heat sink may become lower. Therefore, it is difficult to adopt this method for making the thickness of the metal material film thinner.

In addition, as another method of enhancing the transmittance of the second recording layer 105, reducing the thickness of the recording film, such as the phase change recording film, constituting the second recording layer 105 may be considered. However, making the thickness of the recording film thinner leads to a reduction in the number of crystal nuclei in the recording film, and thus the transfer rate during recording may become lower.

As such, the present invention is one that is proposed in order to solve such conventional problems, and makes it its object to provide an optical recording medium including two or more recording layers, the optical recording medium being capable of transmitting at a high transmittance recording light or reproducing light for performing recording on and reproducing from the first recording layer without making the thickness of the second recording layer positioned on the side from which the recording light or reproducing light enters thinner.

DISCLOSURE OF THE INVENTION

In order to achieve the object above, an optical recording medium related to the present invention is characterized in that it is an optical recording medium having two or more recording layers, in that it includes a first recording layer, and a second recording layer positioned further to the side from which recording light or reproducing light enters than is the first recording layer with an intermediate layer in between, and in that it includes, between the above-mentioned intermediate layer and the above-mentioned second recording layer, a dielectric layer which increases the transmittance for light passing through the second recording layer as the incident angle of the light becomes greater.

With an optical recording medium thus configured, since there exists, between the second recording layer positioned on the side from which the recording light or the reproducing light enters and the intermediate layer, the dielectric layer for increasing the transmittance for the light passing through the second recording layer as the incident angle of the light becomes greater, it is possible to increase the transmittance for light that is incident with a relatively large incident angle with respect to the second recording layer while maintaining the transmittance for light that is incident with an incident angle of 0°. In other words, in increasing the transmittance, at the second recording layer, for the recording light or the reproducing light for performing recording on or reproducing from the first recording layer, there is no need to make the thickness of the second recording layer thinner.

BEST MODES FOR CARRYING OUT THE INVENTION

Hereinafter, a detailed description will be given with respect to an optical recording medium to which the present invention is applied with reference to the drawings.

Figure 1:
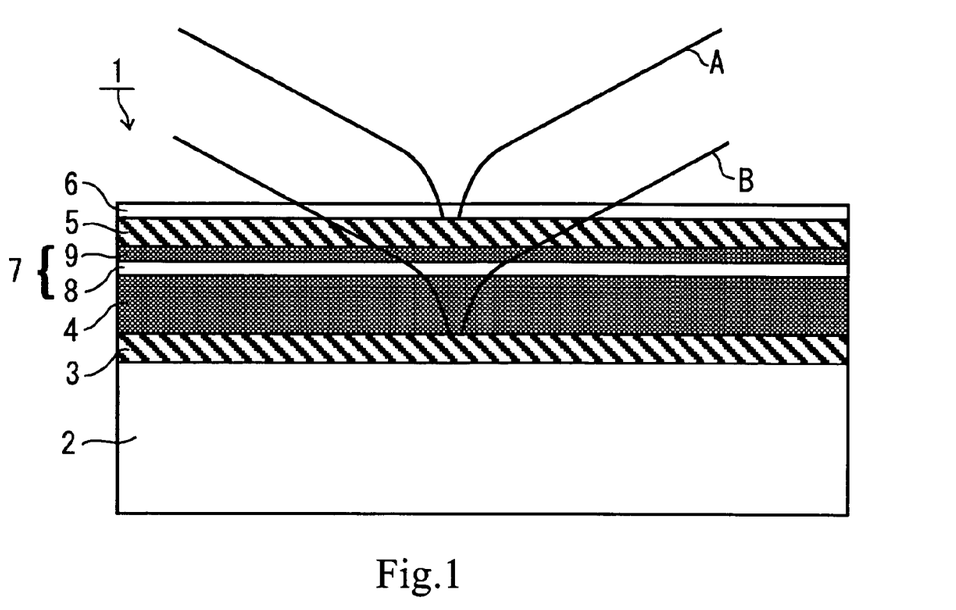
FIG. 1 is a sectional view of a main portion in a case where, in an optical recording medium to which the present invention is applied, the focal spot is positioned on the first recording layer or the second recording layer.

As shown in FIG. 1, in an optical recording medium 1 to which the present invention is applied, a first recording layer 3, an intermediate layer 4, a second recording layer 5 and a cover layer 6 are layered in this order on one principal surface of a substrate 2. In this optical recording medium 1, recording and/or reproducing is performed by having, for example, laser light enter as recording light or reproducing light from the side opposite to the substrate 2, in other words from the side of the cover layer 6.

For the substrate 2, conventionally known materials used in ordinary optical recording media are usable, and, for example, plastics, such as polycarbonate, acryl and the like, and glass and the like are suitable.

If the optical recording medium shown in FIG. 1 is a phase change type optical recording medium, the first recording layer 3 and the second recording layer 5 include, from the substrate 2 side and in order, a metal material film, a dielectric film, a phase change recording film as a recording film, and a dielectric film in this order.

Of these, the phase change recording film contains a phase change recording material which reversibly changes between a crystalline state and an amorphous state, and in which these two states can be detected by the difference in reflectance of the reproducing light. Specifically, besides GeSbTe, which is a chalcogen compound, Te, Se, GeTe, InSbTe, InSeTeAg, InSe, InSeTlCo, InSbSe, $Bi_2Te_3$, BiSe, $Sb_2Se_3$, $Sb_2Te_3$, and the like may be used.

In addition, the metal material film includes metal materials such as Al alloy materials and Ag alloy materials, and the like, and is one which has the function of enhancing, at the time of reproducing, signals recorded on the phase change recording film, and a heat sink function for rapidly cooling the phase change recording film at the time of recording.

In addition, the pair of dielectric films that each of the first recording layer 3 and the second recording layer 5 has includes a transparent dielectric material and the like such as $ZnS$—$SiO_2$, for example.

It is preferable that the intermediate layer 4 be a material having a refractive index higher than the lens numerical aperture NA of the recording and reproducing optical system, and includes $Nb_2O_5$ and the like, for example.

For the cover layer 6, a layered structure, for example, of SiN, $SiO_2$ and SiN may be considered, but other known materials may also be used besides these.

In addition, in this optical recording medium 1, there exists between the intermediate layer 4 and the second recording layer 5 a dielectric layer 7 for enhancing the transmittance for light passing through the second recording layer 5 as the incident angle of the light becomes greater. In the optical recording medium 1 shown in FIG. 1, the dielectric layer 7 has a layered structure of a first dielectric layer 8 having a refractive index n1 that is lower than the refractive index ni of the intermediate layer 4, and a second dielectric layer 9 having a refractive index n2 that is higher than the refractive index nil of the first dielectric layer 8. Of these, the second dielectric layer 9 is positioned towards the second recording layer 5.

As shown in FIG. 1, since laser light A that is focused on the second recording layer 5 forms a focus at its focal spot, within its focal depth, there is almost zero incident angle. In other words, when the focus position of the laser light A is on the second recording layer 5, most of the laser light A near the second recording layer 5 is composed of incident angle components that are perpendicular to the second recording layer 5. On the other hand, when the focus position of laser light B is on the first recording layer 3, there exists the laser light B having large incident angle components with respect to the second recording layer 5.

In the present invention, by adding the dielectric layer 7 between the intermediate layer 4 and the second recording layer 5, the transmittance for laser light that is incident with a relatively large incident angle with respect to the second recording layer 5 that is close to the surface to which the laser light is incident is enhanced without having almost any effect on the transmittance for laser light that is perpendicularly incident. In other words, according to the present invention, without reducing the signal strength while recording on or reproducing from the second recording layer 5, the signal strength for the first recording layer 3 can be enhanced. Therefore, without making the thickness of the recording material layer, the metal material layer and the like in the second recording layer 5 thinner, the transmittance of the second recording layer 5 for the laser light for recording/reproducing on or from the first recording layer 3 can be enhanced, and the intensity of the laser light reaching the first recording layer 3 can be increased. In addition, since a relative increase in the intensity of the laser light reaching the first recording layer 3 can be brought about, as compared to what is conventional, a reduction in the recording power of the laser light while recording on the first recording layer 3 can be realized.

The thickness of each of the first dielectric layer 8 and the second dielectric layer 9 constituting the dielectric layer 7 need only have such a thickness that at least a continuous film can be formed. However, in order to suppress interference by these dielectric layers and not affect the light intensity distribution passing through the dielectric layers, it is preferable that the thickness of each of the first dielectric layer 8 and the second dielectric layer 9 be 100 nm or below.

The method of forming these dielectric layers 7 is not limited to any method in particular, and, for example, a sputtering method or the like is used.

In addition, the present invention is not limited to the description above, and may be modified as deemed appropriate within a range that does not depart from the essence of the present invention. For example, in the description above, as the dielectric layer positioned between the recording layer positioned towards the surface from which the laser light enters and the intermediate layer, a structure including the two layers of the first dielectric layer and the second dielectric layer was given as an example, however, the present invention is not limited thereto. Between the recording layer positioned towards the surface from which the laser light enters and the intermediate layer, so long as there exists, as mentioned above, at least the two layers of the first dielectric layer having the refractive index n1 that is lower than the refractive index ni of the intermediate layer and the second dielectric layer having the refractive index n2 that is higher than the refractive index n1 of the first dielectric layer, other layers may further be included.

In addition, an optical recording medium to which the present invention is applied is not limited to the example above having two recording layers, and may have three or more recording layers. In addition, if the optical recording medium has three or more recording layers, it would suffice to have the dielectric layer mentioned above between at least one recording layer and the intermediate layer.

In addition, in the description above, a description was given with a phase change type optical recording medium as an example, however the present invention is not limited thereto, and may be one of a rewritable optical recording medium such as a magneto-optical recording medium and the like, a recordable optical recording medium, a read-only optical recording medium and the like. For example, in the case of a magneto-optical recording medium, the first recording layer and the second recording layer may have a structure in which are included the above-mentioned reflective film, a dielectric layer of, for example, SiN formed sequentially thereon, a signal recording layer including a first magnetic layer of, for example, a GdFeCo layer and a second magnetic layer of, for example, a TbFeCo layer, and a light transmissive dielectric layer formed thereon including, for example, a $SiO_2$ layer and a SiN layer.

Further, with respect to the shape of the optical recording medium, too, it goes without saying that it may take on various known shapes such as a disk shape, a tape shape and the like. First, as an embodiment, a phase change type optical recording medium of the structure shown in Table 1 below was made. In addition, as a comparative example, a phase change type optical recording medium of the structure shown in Table 2 below was made. The optical recording medium of the comparative example differs from the optical recording medium of the embodiment in that a dielectric layer is not formed between the intermediate layer and the second recording layer. Each of the layers constituting the embodiment and the comparative example is one that is formed by a sputtering method.

In addition, the thickness of an air layer between an objective lens and the optical recording medium at the time of recording on or reproducing from these optical recording media is set to 50 nm. In addition, as the objective lens of the recording and reproducing optical system, an objective lens whose refractive index is 1.83 was used. In addition, in Table 1 and Table 2, the phase change recording material in the phase change recording film was abbreviated as PC (Phase Change). The phase change recording material here is a $Ge_2Sb_2Te_5$ phase change material.

TABLE 1

| | Material | Refractive Index | Film Thickness (nm) |
|---|---|---|---|
| Cover Layer | SiN | 2.00 | 25 |
| | $SiO_2$ | 1.47 | 75 |

TABLE 1-continued

| | Material | Refractive Index | Film Thickness (nm) |
|---|---|---|---|
| | SiN | 2.00 | 20 |
| Second Recording Layer | ZnS—$SiO_2$ | 2.35 | 80 |
| | PC (Crystalline State/Amorphous State) | 2.03-2.99i/ 3.05-1.9i | 6 |
| | ZnS—$SiO_2$ | 2.35 | 20 |
| | Ag | 0.182-2.10i | 6 |
| Second Dielectric Layer | $Nb_2O_5$ | 2.40 | 20 |
| First Dielectric Layer | SiN | 2.00 | 50 |
| Intermediate Layer | $Nb_2O_5$ | 2.40 | 2000 |
| First Recording Layer | ZnS—$SiO_2$ | 2.35 | 80 |
| | PC (Crystalline State/Amorphous State) | 2.03-2.99i/ 3.05-1.9i | 12 |
| | ZnS—$SiO_2$ | 2.35 | 12 |
| | Al | 0.5-4.2i | 100 |

TABLE 2

| | Material | Refractive Index | Film Thickness (nm) |
|---|---|---|---|
| Cover Layer | SiN | 2.00 | 25 |
| | $SiO_2$ | 1.47 | 75 |
| | SiN | 2.00 | 20 |
| Second Recording Layer | ZnS—$SiO_2$ | 2.35 | 80 |
| | PC (Crystalline State/Amorphous State) | 2.03-2.99i/ 3.05-1.9i | 6 |
| | ZnS—$SiO_2$ | 2.35 | 20 |
| | Ag | 0.182-2.10i | 6 |
| Intermediate Layer | $Nb_2O_5$ | 2.40 | 2000 |
| First Recording Layer | ZnS—$SiO_2$ | 2.35 | 80 |
| | PC (Crystalline State/Amorphous State) | 2.03-2.99i/ 3.05-1.9i | 12 |
| | ZnS—$SiO_2$ | 2.35 | 12 |
| | Al | 0.5-4.2i | 100 |

Figure 2:
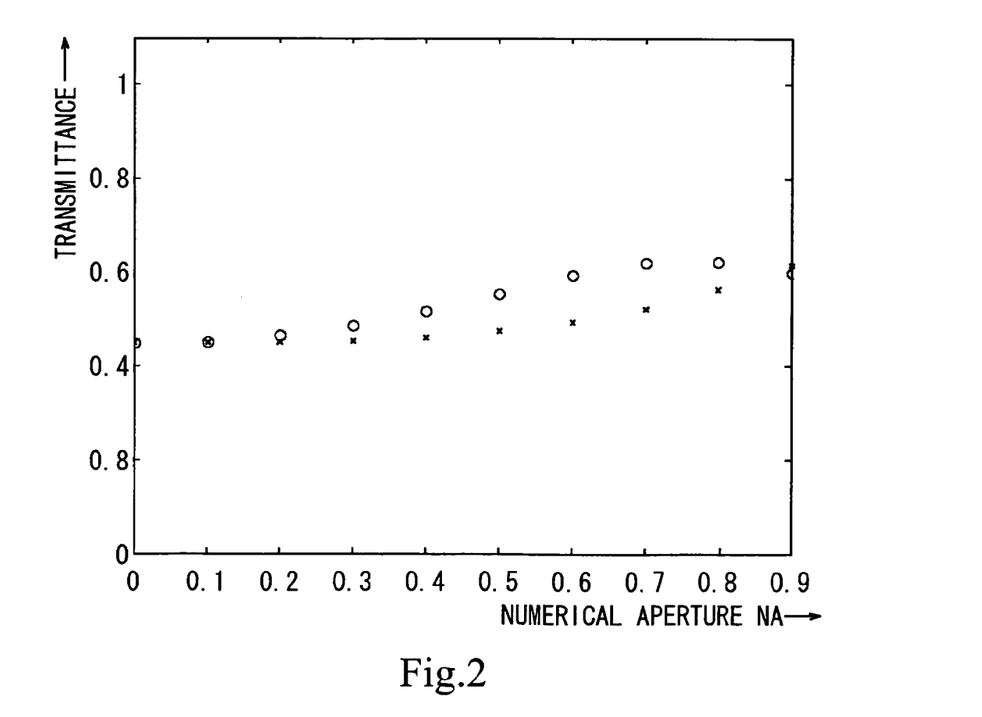
FIG. 2 is a characteristics chart indicating the incident-angle (numerical aperture) dependence of transmittance in a case where the second recording layer of an embodiment is in an amorphous state.
Figure 3:
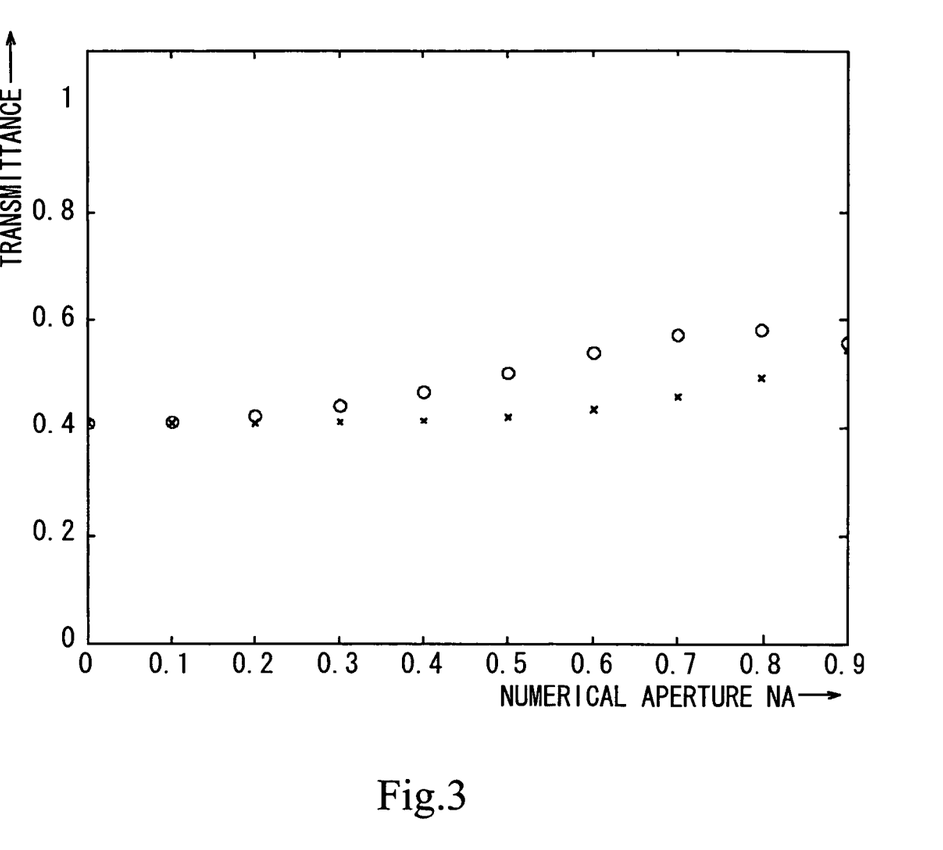
FIG. 3 is a characteristics chart indicating the incident-angle (numerical aperture) dependence of transmittance in a case where the second recording layer of an embodiment is in a crystalline state.
Figure 4:
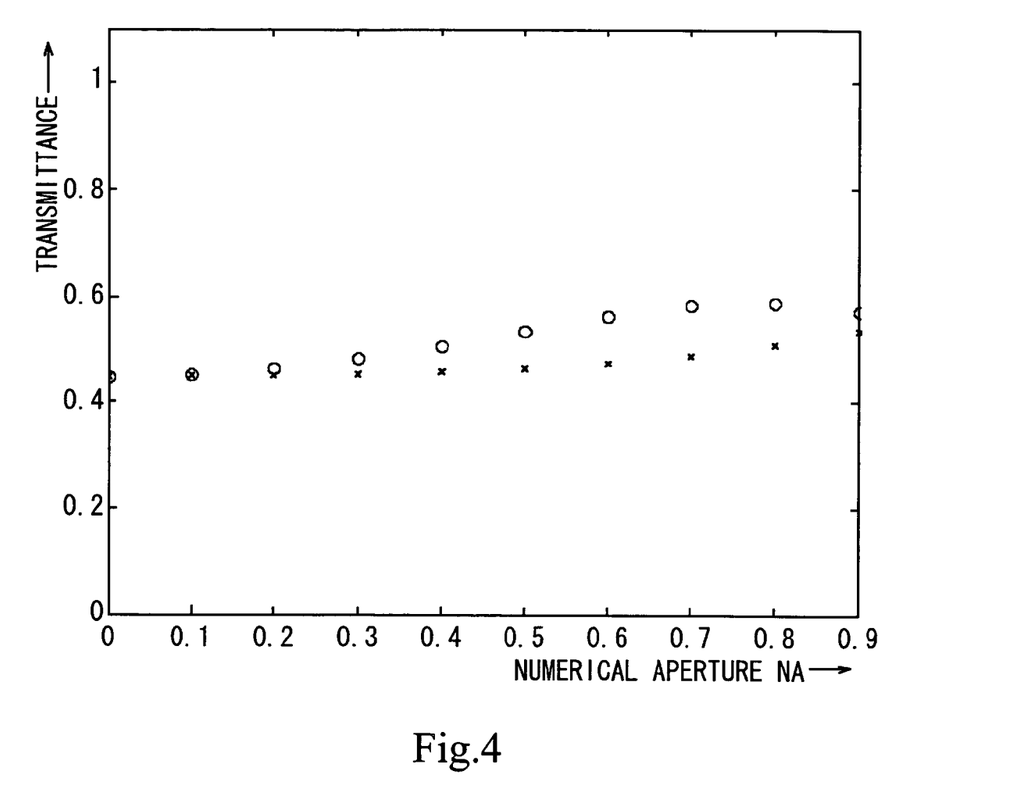
FIG. 4 is a characteristics chart indicating the incident-angle (numerical aperture) dependence of transmittance in a case where the second recording layer of a comparative example is in an amorphous state.
Figure 5:
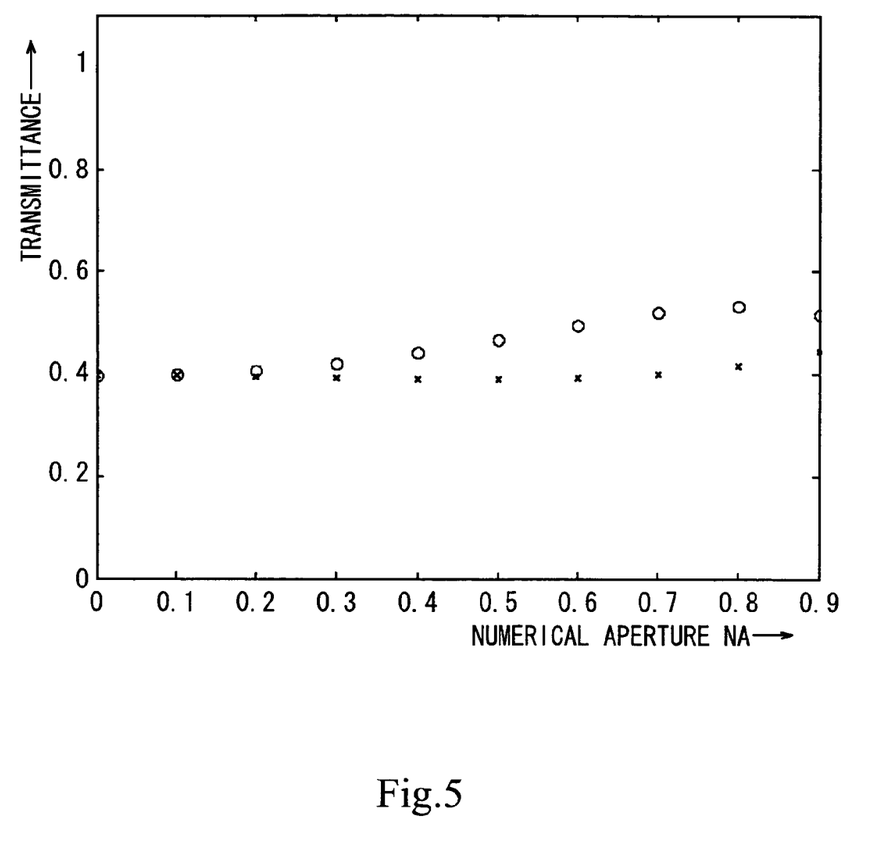
FIG. 5 is a characteristics chart indicating the incident-angle (numerical aperture) dependence of transmittance in a case where the second recording layer of a comparative example is in a crystalline state.

With respect to each of the amorphous state and the crystalline state of these optical recording media, recording and reproducing were performed by so-called near field recording in which the lens numerical aperture NA of the recording and reproducing optical system is 1.5 using blue color laser light (wave length 405 nm). The results of the incident angle (numerical aperture) dependence of the transmittance of the second recording layer of the embodiment in this instance are shown in FIG. 2 and FIG. 3. In addition, the results of the incident angle (numerical aperture) dependence of the transmittance of the second recording layer of the comparative example are shown in FIG. 4 and FIG. 5. In addition, in FIG. 2 through FIG. 5, the transmittance for P-polarized light is indicated with circles, and the transmittance for S-polarized light is indicated with crosses. In addition, the vertical axis in FIG. 2 through FIG. 5 represents the transmittance of the second recording layer, and the optical axis represents the lens numerical aperture NA.

FIG. 2 is a chart showing the incident angle (numerical aperture) dependence of transmittance in a case where the second recoding layer of the embodiment is in an amorphous state. In addition, FIG. 3 is a chart showing the incident angle (numerical aperture) dependence of transmittance in a case where the second recoding layer of the embodiment is in a crystalline state. FIG. 4 is a chart showing the incident angle (numerical aperture) dependence of transmittance in a case where the second recoding layer of the comparative example is in an amorphous state. In addition, FIG. 5 is a chart showing the incident angle (numerical aperture) dependence of transmittance in a case where the second recoding layer of the comparative example is in a crystalline state As is apparent from FIG. 2 through FIG. 5, with respect to laser light whose incident angle is 0°, in other words laser light that enters with an incident angle that is perpendicular to the substrate, there is no difference in the transmittance of the second recording layer between the embodiment and the comparative example. On the other hand, as the incident angle becomes greater, the transmittance of the second recording layer of the embodiment is showing higher results as compared to the transmittance of the second recording layer of the comparative example. In addition, for either of the amorphous state and the crystalline state, and also for either of the S-polarized light and the P-polarized light, similar results were obtained.

Therefore, it can be seen that by positioning a dielectric layer such as the one shown in Table 1 between the intermediate layer and the second recording layer, the transmittance of the second recording layer for the laser light for performing recording/reproducing with respect to the first recording layer and which has components of large incident angles can be increased.

Figure 6:
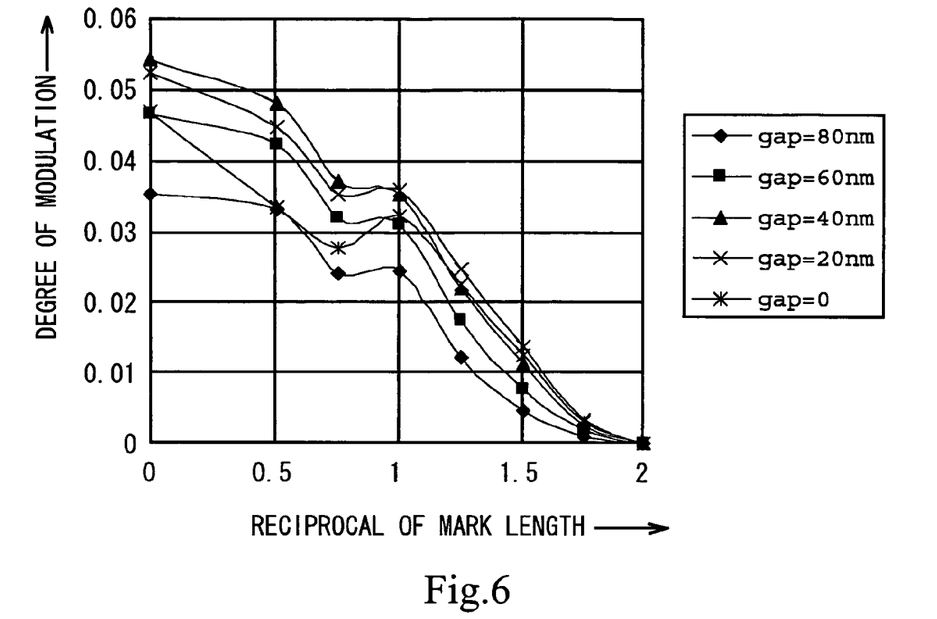
FIG. 6 is a characteristics chart indicating simulation results for the modulation transfer function of reproduced signals with respect to the second recording layer of an embodiment.
Figure 7:
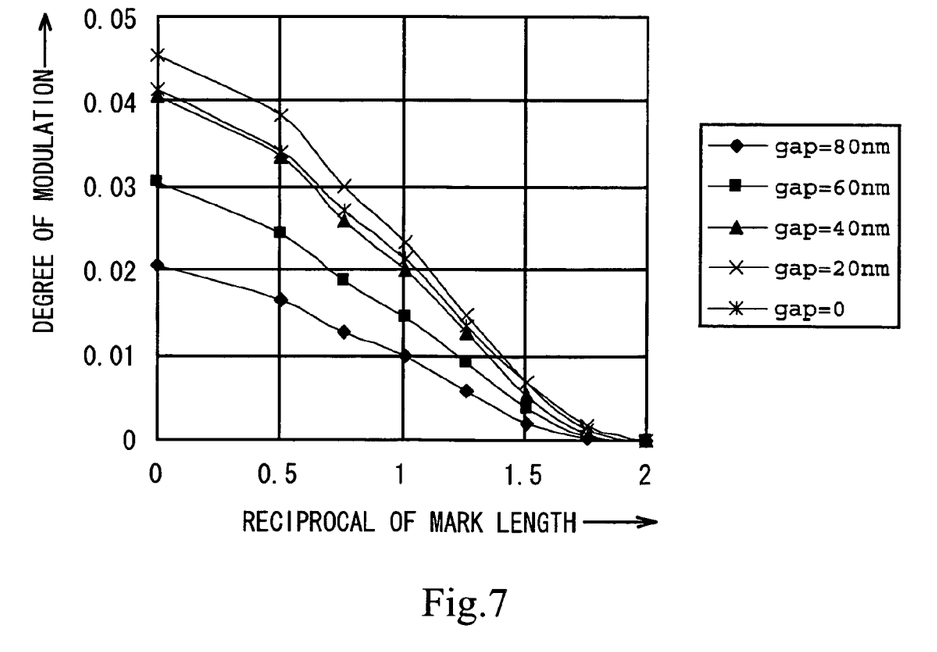
FIG. 7 is a characteristics chart indicating simulation results for the modulation transfer function of reproduced signals with respect to the first recording layer of an embodiment.
Figure 8:
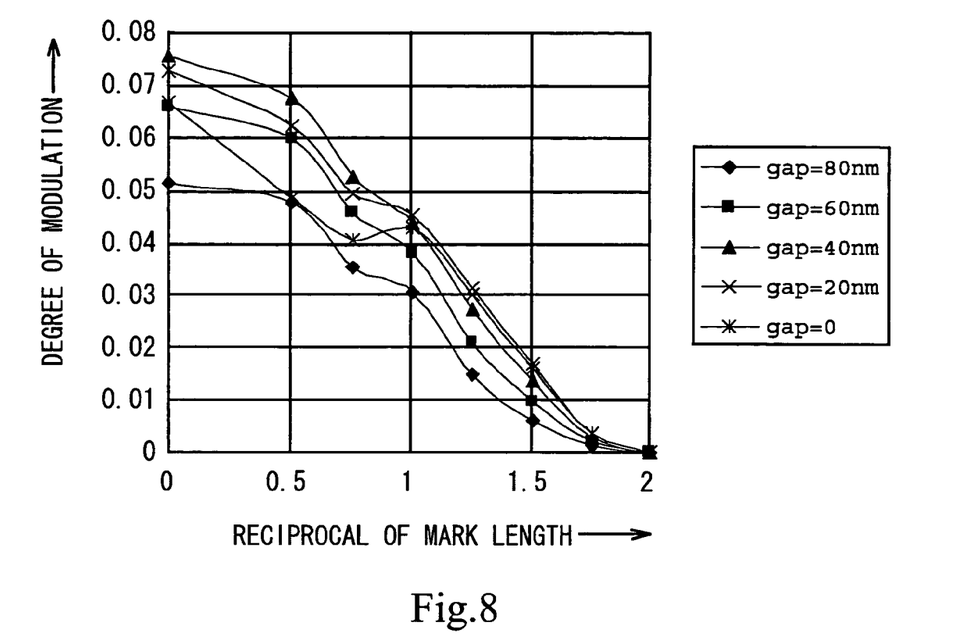
FIG. 8 is a characteristics chart indicating simulation results for the modulation transfer function of reproduced signals with respect to the second recording layer of a comparative example.
Figure 9:
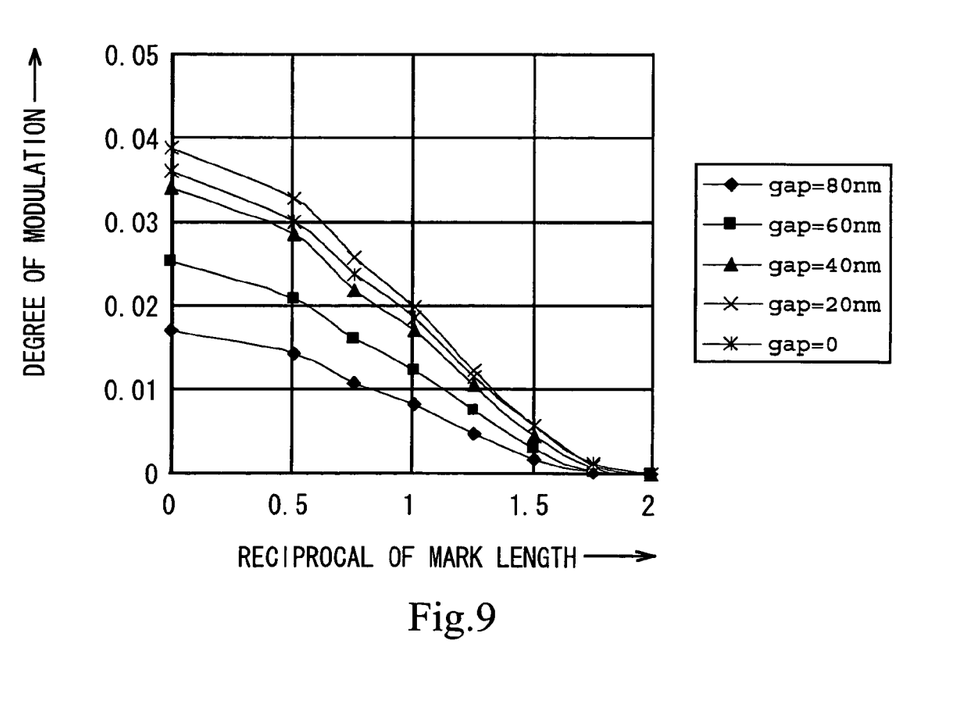
FIG. 9 is a characteristics chart indicating simulation results for the modulation transfer function of reproduced signals with respect to the first recording layer of a comparative example.

In addition, with respect to the above-mentioned embodiment and comparative example, simulation results on the modulation transfer function (MTF) of reproduced signals are shown in FIG. 6 through FIG. 9. FIG. 6 is the results for the second recording layer of the embodiment. FIG. 7 is the results for the first recording layer of the embodiment. FIG. 8 is the results for the second recording layer of the comparative example. FIG. 9 is the results for the first recording layer of the comparative example. In FIG. 6 through FIG. 9, the vertical axis represents degree of modulation, and the horizontal axis represents reciprocals of the mark length. In addition, in FIG. 6 through FIG. 9, gap refers to the thickness of the air layer.

As is apparent when FIG. 7 and FIG. 9 are compared, it can be seen that the reproducing signal strength of the first recording layer of the embodiment is more enhanced as compared to the reproducing signal strength of the first recording layer of the comparative example. In addition, although the reproducing signal strength of the second recording layer of the embodiment shown in FIG. 6 indicates slightly lower values as compared to the reproducing signal strength of the second recording layer of the comparative example shown in FIG. 8, it is conceivable that the cause thereof is that the MTF simulation tool used does not support the beam waist.

From FIG. 2 through FIG. 9 above, it was found that by positioning the dielectric layer, which includes a layered structure of the first dielectric layer having the refractive index n1 that is lower than the refractive index ni of the intermediate layer and the second dielectric layer having the refractive index n2 that is higher than the refractive index n1 of the first dielectric layer, between the intermediate layer and the second recording layer positioned towards the surface from which the laser light enters, and that by optimizing the thicknesses and the refractive indices of these dielectric layers, the recording and reproducing characteristics of the first recording layer are improvable without having almost any effect on the recording and reproducing characteristics of the second recording layer.

In addition, the present invention is not limited to the above-described embodiment. In other words, although in the above-described embodiment, an optical recording medium of a structure that does not at all change the transmittance for laser light that is perpendicularly incident with respect to the second recording layer is given as an example, the present invention is not limited thereto. For example, the present invention can also enhance the signal strength of the first recording layer by increasing the transmittance for laser light incident with a large incident angle with respect to the second recording layer in addition to adjusting the signal strength of the second recording layer by adjusting the transmittance for laser light that is perpendicularly incident with respect to the second recording layer by adding the dielectric layer.

In addition, in the description above, an optical recording medium in which the refractive index ni of the intermediate layer and the refractive index n2 of the second dielectric layer are equal was given as an example, however the present invention is not limited thereto. In other words, so long as the refractive index ni of the intermediate layer, the refractive index nil of the first dielectric layer and the refractive index n2 of the second dielectric layer satisfy the relationship expressed in ni>n1 and n2>n1, the effects of the present invention can be achieved.

In addition, in the description above, a case in which an optical recording medium of the present invention was applied to so-called near field recording in which the lens numerical aperture NA of the recording and reproducing optical system is 1 or greater was given as an example, however the present invention is not limited thereto. In other words, it is naturally possible to use the optical recording medium of the present invention in combination with an ordinary recording and reproducing optical system in which the lens numerical aperture NA of the recording and reproducing optical system is less than 1.

As is apparent from the description above, an optical recording medium related to the present invention is capable of increasing the intensity of recording light or reproducing light for performing recording or reproducing with respect to the first recording layer, because without having to make the thickness of the second recording layer thinner, the recording light or reproducing light for performing recording/reproducing of the first recording layer passes through the second recoding layer with a high transmittance. Therefore, according to the present invention, it is possible to provide an optical recording medium in which an improvement in the recording and reproducing characteristics of the first recording layer is realized without compromising the recording and reproducing characteristics of the second recording layer.

The invention claimed is:

1. An optical recording medium including two or more recording layers, comprising:
  a first recording layer, and a second recording layer, the second recording layer positioned at a side of the first recording layer on which recording light or reproducing light is incident upon the recording medium with an intermediate layer in between; and
  a dielectric layer, between said intermediate layer and said second recording layer, for increasing transmittance for light passing to said first recording layer as the incident angle of the light becomes greater;
  wherein said dielectric layer comprises a layered structure of a first dielectric layer exhibiting a refractive index that is lower than a refractive index of said intermediate layer and a second dielectric layer exhibiting a refractive index that is higher than the refractive index of said first dielectric layer.

2. The optical recording medium according to claim 1, wherein said first recording layer and/or second recording layer comprise a metal material layer, a signal recording layer, and dielectric layers positioned on both sides of said signal recording layer.

3. An optical recording medium including two or more recording layers, comprising:
- a first recording layer, and a second recording layer, the second recording layer positioned at a side of the first recording layer on which recording light or reproducing light is incident upon the recording medium with an intermediate layer in between; and
- a dielectric layer, between said intermediate layer and said second recording layer, for increasing transmittance for light passing to said first recording layer as the incident angle of the light becomes greater;
- wherein said first recording layer and/or second recording layer comprise a metal material layer, a signal recording layer and dielectric layers positioned on both sides of said signal recording layer; and
- wherein said signal recording layer contains a phase change recording material.

4. The optical recording medium according to claim 1, wherein recording and/or reproducing are performed by a recording and reproducing optical system whose lens numerical aperture is 1 or greater.

5. The optical recording medium according to claim 1, wherein said second recording layer is in contact with said dielectric layer.

6. An optical recording medium including two or more recording layers, comprising:
- a first recording layer and a separate second recording layer with an intermediate layer disposed therebetween; and
- a dielectric layer, between said intermediate layer and said second recording layer, for increasing transmittance for light passing to said first recording layer after having passed through said first recording layer as the incident angle of the light becomes greater;
- wherein said dielectric layer comprises a layered structure of a first dielectric layer exhibiting a refractive index that is lower than a refractive index of said intermediate layer and a second dielectric layer exhibiting a refractive index that is higher than the refractive index of said first dielectric layer.

7. An optical recording medium including two or more recording layers, comprising:
- a first recording layer and a separate second recording layer with an intermediate layer disposed therebetween; and
- a dielectric layer, between said intermediate layer and said second recording layer, for increasing transmittance for light passing to said first recording layer after having passed through said first recording layer as the incident angle of the light becomes greater;
- wherein said first recording layer and/or second recording layer comprise a metal material layer, a signal recording layer, and dielectric layers positioned on both sides of said signal recording layer, and
- wherein said signal recording layer contains a phase change recording material.

8. The optical recording medium according to claim 1, wherein said first recording layer comprises a metal material layer, a signal recording layer, and dielectric layers positioned on both sides of said signal recording layer.

9. The optical recording medium according to claim 1, wherein said second recording layer comprises a metal material layer, a signal recording layer, and dielectric layers positioned on both sides of said signal recording layer.

10. The optical recording medium according to claim 1, wherein said first recording layer and said second recording layer each comprise a metal material layer, a signal recording layer, and dielectric layers positioned on both sides of said signal recording layer.

11. An optical recording medium including two or more recording layers, comprising:
- a first recording layer, and a second recording layer, the second recording layer positioned at a side of the first recording layer on which recording light or reproducing light is incident upon the recording medium with an intermediate layer in between; and
- a dielectric layer, between said intermediate layer and said second recording layer, for increasing transmittance for light passing to said first recording layer as the incident angle of the light becomes greater;
- wherein said dielectric layer is formed on said intermediate layer, and a portion of the dielectric layer in contact with the intermediate layer has a refractive index different from the refractive index of the intermediate layer.

12. The optical recording medium according to claim 11, wherein a second portion of the dielectric layer different than the portion in contact with the intermediate layer has a refractive index substantially the same as the refractive index of the intermediate layer.

* * * * *